United States Patent [19]

Marx et al.

[11] Patent Number: 4,774,268

[45] Date of Patent: Sep. 27, 1988

[54] PROCESS FOR THE PREPARATION OF FLAME RESISTANT POLYURETHANE COMPOSITIONS

[75] Inventors: Hans-Norbert Marx, Buehl-Weitenung; Wendelin Hettler, Sinzheim-Muellhofen, both of Fed. Rep. of Germany

[73] Assignee: Dr. Wolman GmbH, Sinzheim, Fed. Rep. of Germany

[21] Appl. No.: 146,223

[22] Filed: Jan. 20, 1988

[30] Foreign Application Priority Data

Jan. 27, 1987 [DE] Fed. Rep. of Germany ....... 3702249

[51] Int. Cl.⁴ ............................................. C09K 21/14
[52] U.S. Cl. .................................... 523/179; 521/106; 521/117; 521/128; 521/129; 521/136; 521/902; 521/906; 521/907
[58] Field of Search .............. 521/907, 906, 106, 136, 521/128, 129, 117, 902; 523/179

[56] References Cited

U.S. PATENT DOCUMENTS

| | | | |
|---|---|---|---|
| 4,210,725 | 7/1980 | Redfarn | 521/907 |
| 4,404,297 | 9/1983 | Fishler et al. | 521/907 |
| 4,442,157 | 4/1984 | Marx et al. | 521/907 |
| 4,542,170 | 9/1985 | Hall et al. | 521/907 |
| 4,599,369 | 7/1986 | Brown | 523/179 |

*Primary Examiner*—Morton Foelak
*Attorney, Agent, or Firm*—Norbert M. Lisicki; William G. Conger

[57] ABSTRACT

Flame resistant foams and other compositions containing polyurethane and/or polyisocyanurate groups are prepared by reacting an organic polyisocyanate with a polyol in the presence of flame retardants, catalysts, blowing agents as well as optionally chain extenders, cross-linkers auxiliaries and additives. The flame retardents comprise a phenol or melamine formaldehyde condensate, pentaerythritol as well as ammonium phosphate and preferably in addition dicyandiamide.

4 Claims, No Drawings

PROCESS FOR THE PREPARATION OF FLAME RESISTANT POLYURETHANE COMPOSITIONS

The preparation of polyurethane foams containing both polyurethane and polyisocyanurate groups, and other compositions are all well-known. For improving fire retardancy, halogen containing polyols or additives containing either halogens and phosphorus may be incorporated into these foams or compositions.

For increasing fire retardancy, in addition one can employ a number of metal oxides, such as for example $ZnO$, $B_2O_3$, $Fe_2O_3$, $CaO$, $Sb_2O_3$. These compounds alone exhibit no fire retardant affect, yet together with the organic bound halogen they bring about a synergistic effect. The most effective system in polyol urethane foams has proven to be antimony (III)-oxide/halogen (See. W. C. Kuryla and A. J. Lapa, *Flame Retardancy of Polymeric Materials*, Vol. 3, Publisher: Marcel Dekker, New York, 1975).

A disadvantage here is that antimony-(III)-oxide brings about a definite embrittlement of the compositions. Moreover, the compound demonstrates hazardous toxicological properties (allegedly carcinogenic). Finally, due to its great hardness it is difficult to process and it causes abrasion in the mixing units of machines. A number of phosphorous containing flame retardants are other typical flame inhibiting additives, such as for example, phosphates, phosphonates and phosphites. These compounds, which sometimes additionally contain a halogen, are either used alone or combined with other halogen containing compounds.

Known also are hypophosphites with inorganic and organic cations, e.g. aluminum- or melamine hypophosphite.

An overview regarding flame proofing polyurethanes is found in the handbook *Flame Retardancy of Polymeric Materials*, Vol. 3 (Publisher: Marcel Dekker, New York, 1978).

An object of the present discovery is to provide a practically non-toxic replacement for antimony (III) oxide and halogen compounds in polyurethane compositions, which when released during fires exhibit disadvantages primarily due to their toxic respiratory effect.

Another object is to provide flame resistant polyurethane compositions, preferably foams, whose volume does not change and/or possibly even increases in a fire or under the influence of heat, whereby the existing compositions will be replaced by a heat stable and heat insulating material.

Such heat insulating materials, which only result during the fire itself, are in the form of carbon arrangements with a porous structure; they form when heated together with certain raw materials and several of such mixtures are disclosed in for example DEOS No. 28 07 679 and/or in U.S. Pat. No. 4,442,157.

The subject of the present discovery is accordingly compositions, obtained by the reaction of organic polyisocyanates with polyols in the presence of flame retardants, catalysts and optionally blowing agents as well as optionally chain extending agents, cross linking agents, auxiliaries and additives, which comprise a phenol or melamine formaldehyde condensate, preferably a heat reducing organic nitrogen compound such as dicyandiamide, a carbohydrate or a multivalent alcohol such as pentaerythritol as well as ammoniumphosphate, in a mixture as a flame retardant.

The addition of the flame retardant in the preparation can occur as a compound or in the form of the individual components.

The compositions exhibit substantially less embrittlement than the corresponding compositions containing antimony-(III)-oxide. They demonstrate good mechanical properties and an increased flame resistance, particularly when they are compositions in very dense foams.

Compared with conventional phosphorous and halogen containing flame retardant systems, the above mentioned mixtures used according to the process of this invention bring about a substantial reduction in halogen compounds. This reduction of flame retardant brings about a positive effect on the mechanical properties primarily of the foams. It is known that larger quantities of phosphorous compounds used as flame retardant additives in polyurethane bring about a definite plasticizing effect.

The major advantage of said composition lies not so much in its property of lowering the flammability of polyurethane foams, but it lies in the fact that the compositions themselves expand in a fire and therefore a significant fire resistant effect is provided for foams containing said composition. Even with long term exposure to fire and heat, the present foam will not be attacked in the core, since it is covered with a carbon foam, which brings about a high heat insulating effect and thus activates the flame inhibition. When dealing with other compositions in foams, e.g. rubbers, etc., during heating considerable volume expansion occurs while forming an effective flame resistant carbon structure.

However, the ability of certain fire resistant compositions of forming carbon containing foams in a fire was not clear from the data obtained at this point. Surviving in a fire are certain mixtures even in the presence of per se very easily flammable polyurethane foams. Moreover, one had to take into consideration that the mixtures in the polyurethane foams are not present individually but are contained as random mixtures of their individual components.

On the other hand it is surprising that the complicated reaction of components which form polyurethane foams is not particularly influenced by using said mixture (this information has resulted from numerous publications of all kinds which have appeared regarding this subject).

Depending on the application, very different quantities of flame retardant can be used. Generally, it has proven to be advantageous to use from 5 to 500 parts by weight, more preferably from 50 to 150 parts by weight of said mixture for each 100 parts by weight of polyurethane. The required quantity depends on the desired effect: often less is required in filling hollow spaces than is required in rigid foams which are used for example in automobiles. Moreover, in films, sealing compositions and similar products often only small quantities are sufficient.

The following can be said with respect to the starting materials used in the process of the invention: Typically used as polyisocyanates are aliphatic, cycloaliphatic, araliphatic and preferably aromatic multivalent isocyanates. The following are individual examples: alkylene diisocyanates having from 4 to 12 carbon atoms in the alkylene radical such as 1,12-dodecamethylene-diisocyanate, tetramethylene-1,4-diisocyanate and preferably hexamethylene-1,6-diisocyanate; cycloaliphatic diisocyanates such as cyclohexane-1,3- and cyclohexane 1,4-diisocyanate as well as optional mixtures of the isomers, 1-isocyanato-3,3,5-trimethyl-5-isocyanatomethylcyclohexane (isophoronediisocynate), 2,4- and 2,6-hexahydrotoluene-diisocyanate as well as the corresponding isometric mixtures 4,4'-, 2,2'- and 2,4'-dicyclohexylmethanediisocyanate as well as the corresponding isomeric mixtures and preferably aromatic di- and polyisocyanates such as 4,4'-, 2,4'- and 2,2'-diphenylmethane diisocyanate and the corresponding isomeric mixtures, 2,4- and 2,6-toluene diisocyanate and the corresponding isomeric mixtures, 1,5-naphthalene, diisocyanate polyphenyl-polymethylene-polyisocyanates 2,4,6-toluenetriisocyanate and preferably mixtures of diphenylmethanediisocyanates and polymethylene polyisocyanates. The aforesaid di- and polyisocyanates can be used individually or in the form of mixtures.

Also frequently used are the so-called modified multivalent isocyanates, i.e. products which have been obtained by the chemical reaction of the above mentioned di- and polyisocyanates. Examples of modified organic di- and polyisocyanates are those disclosed in for example: DE-PS No. 10 92 007 GB-PS No. 994 890, Belgium Patent No. 761 626, NL-OS No. 71 02 524 and in DE-PS Nos. 10 22 789, 12 22 067 and 10 27 394 as well as in DE-OS Nos. 19 29 034 and 20 04 048. Additional data about such polyisocyanates is found in Belgium Patent No. 752 261 or in U.S. Pat. No. 3,394,164, and DE-PS No. 12 30 778, DE-PS No. 11 01 394 and Great Britain Patent No. 889 050; polyisocyanates prepared by telomerization reactions e.g. corresponding to Belgium Patent No. 723 640, polyisocyanates containing ester groups such as for example found in Great Britain Patent Nos. 965 474 and 10 72 956, in U.S. Pat. No. 3,567,765 and in DE-PS No. 12 31 688.

However, preferably used are: urethane group containing polyisocyanates, for example with lower molecular weight diols, triols, or polypropylene glycols, modified 4,4'-diphenylmethane diisocyanate or toluene diisocyanate, carbodiimide group and/or isocyanurate ring containing polyisocyanates, e.g. those based on diphenylmethane diisocyanate and/or toluene diisocyanate and most preferably toluenediisocyanates diphenylmethane-diisocyanate, mixtures of diphenylmethane-diisocyanates and polyphenyl-polymethylene-polyisocyanates (Polymeric MDI) and the mixtures of toluene diisocyanates and polymeric MDI.

Typical polyols are: polyester polyols having functionalities from 2 to 6, more preferably from 2 to 4 and hydroxyl numbers of 200 to 700, more preferably from 280 to 490 based on organic dicarboxylic acids, more preferably aliphatic dicarboxylic acids having from 2 to 12 carbon atoms more preferably from 4 to 8 carbon atoms in the alkylene radical, and multivalent alcohols, preferably diols. Individuals examples are: aliphatic dicarboxylic acids such as for example succinic acid, glutaric acid, pimellic acid, undecanoic acid, dodecanoic acid, and preferably adipic acid and aromatic dicarboxylic acids, such as for example phthalic acid and terephthalic acid. Examples of di and multivalent, most preferably divalent alcohols are: 1,2- and/or 1,3-propylene glycol, dipropylene glycol, 1,5-pentamethylene glycol, 1,8-octamethylene glycol, 1,10-decamethylene glycol, glycerine, trimethylolpropane, pentaerythritol as well as sugar alcohols such as for example sorbitol and preferably ethylene glycol, diethylene glycol, 1,4- butylene glycol and 1,6-hexamethylene glycol. Alkanolamine, dialkanolamine and trialkanolamine, such as for example ethanolamine, diethanolamine, triethanolamine and triisopropanolamine all can be used as multivalent alcohols. The above mentioned dicarboxylic acids and multivalent alcohols are able to be used in addition in the form of mixtures. Most preferably used are polyester polyols from adipic acids or mixtures of succinic, glutaric and adipic acids and diethylene glycol and alcohol mixtures of: ethylene glycol/1,4-butylene glycol, ethylene glycol/diethyleneglycol, ethylene glycol/trimethylolpropane, diethylene glycol/trimethylolpropane, ethylene glycol/pentaerythritol, ethylene glycol/triisopropanolamine and diethylene glycol/triisopropanolamine.

The polyester polyols have molecular weights from about 220 to 3000 and more preferably from 300 to 800.

In place of the above mentioned polyester polyols which are able to be employed individually or as mixtures, one can also employ homogenous, liquid at from 10° to 30° C., mixtures of the above mentioned polyester polyols and difficultly soluble organic compounds for example hydroxyl group containing polyesters from aromatic dicarboxylic acids and more preferably unsubstituted linear diols. However, preferably used as polyols are polyether polyols having functionalities from 2 to 8, more preferably from 2 to 4, and having hydroxyl numbers of 150 to 800, more preferably from 200 to 600, which are prepared according to known processes, for example by the anionic polymerization with alkali hydroxides such as sodium or potassium hydroxide or alkali alkoholates such as sodium or potassium methylate, ethylate or potassium isopropylate used as catalysts, or the cationic polymerization using Lewis acids such as antimony pentachloride, borontrifluoride-etherate, etc., as catalysts from one or more alkylene oxides having from 2 to 4 carbon atoms in an alkylene radical and from an initiator molecule, which contains in bonded form 2 to 8, more preferably from 2 to 4 active hydrogen atoms.

Typical alkylene oxides are: tetrahydrofuran, 1,3-propylene oxide, 1,2- and/or 2,3-butylene oxide, styreneoxide, epichlorohydrin and preferably ethylene and 1,2-propylene oxide . The ethylene oxides can be used individually alternating one after another or as mixtures. Typical initiator molecules are: water, organic dicarboxylic acids such as succinic acid, adipic acid, phthalic acid and terephthalic acid, aliphatic and aromatic, optionally N-mono, N,N- and N,N'-dialkylsubstituted diamines having from 1 to 4 carbon atoms in the alkyl radical such as optionally mono and dialkylsubstituted ethylenediamine, diethylenetriamine, triethylenetetramine, 1,3-propylenediamine, 1,3- and/or 1,4-butylenediamine, 1,2-, 1,3-, 1,4-, 1,5- and 1,6-hexamethylenediamine, phenylenediamine, 2,4- and 2,6-toluenediamine and 4,4'-, 2,4'- and 2,2'-diaminodiphenylmethane. Of particular interest as polyether polyols, which are prepared from compounds in the above mentioned groups are: N,N,N',N'-tetrakis-(2-hydroxyethyl)-ethylenediamine, N,N,N',N'-tetrakis-(2-hydroxy-propyl)-ethylenediamine, N,N,N',N'-pentakis-(2-hydroxypropyl)-diethylene-triamine, phenyldiisopropanolamine and higher alkyleneoxide adducts of aniline.

Other typical initiator molecules are: alkanolamines, such as ethanolamine, diethanolamine, N-methyl- and N-ethylethanolamine, N-methyl- and N-ethyl-diethanolamine and triethanolamine, ammonia, hydrazine and hydrazides. Preferably used are multivalent and most preferably di- and/or trivalent alcohols such as for example ethylene glycol, 1,2-and 1,3-propylene glycol, diethylene glycol, dipropylene glycol, 1,4-butylene glycol, 1,6-hexamethylene glycol, glycerin, trimethylolpropane, pentaerythritol sorbitol and sucrose.

The polyolether polyols have molecular weights from 200 to 4000 and more preferably from 500 to 3000. Just as the polyester polyols they can be employed individually or in the form of mixtures.

In addition, crystalline suspensions in polyols can be used as they are described in German Patent No. 30 01 462.1. They too can be used either individually or in the form of mixtures.

Carbon dioxide formed from water which reacts with the isocyanate groups is among the blowing agents which can be used in the process of invention for preparing foams. The most preferred amounts of water used is from 0.1 to 3 weight percent, based in the weight of the polyisocyanate, and/or from 0.1 to 2 weight based on the total weight of polyisocyanate and polyol. In addition other quantities of water may also be used.

Other blowing agents which may be used are low boiling point liquids which evaporate as a result of the exothermic polymerization and/or polyaddition reaction. Suitable are liquids which are inert with respect to the organic polyisocyanate and liquids which have boiling points below 50° C. Examples of such preferably used liquids are: halogenated hydrocarbons such as methylene chloride, trichlorofluoromethane, dichlorodifluoromethane, dichloromonfluoromethane, dichlorotetrafluoroethane and 1,1,2-trichloro-1,2,2-trifluoroethane. One may also employ mixtures of these low boiling point liquids with one another and/or with other substituted or unsubsitituted hydrocarbons.

The most desirable amount of low boiling point liquid for preparing foams depends on the intended density as well as depending on whether water is also optionally used. Generally, amounts from 5 to 40 weight percent based on 100 parts by weight of organic polyisocyanate, and/or from 2 to 30 weight percent based on the total weight of polyisocyanate and polyol, provide satisfactory results.

Typical catalysts between the polyols, and optionally water, and the polyol isocyanates are for example tertiary amines such as dimethylbenzylamine, N,N,N',N'-tetramethyldiamino-ethylether, bis-(dimethylaminopropyl)-urea, N-methyl- and/or N-ethylmorpholine, dimethylpiperazine, 1,2-dimethylimidazole, 1-azo-bicyclo-(3,3,0)-octane, and preferably triethylenediamine, metal salts such as tin dioctoate, lead octoate, tin ethylhexoate and preferably tin (II) salts and dibutyltin dilaurate as well as most preferably mixtures of tertiary amines and organic tin salts. Preferably from 0.1 to 5.0 weight percent of catalysts based on tertiary amines and/or from 0.01 to 1.0 weight percent of metal salts is used based on the weight of the polyols.

Ordinary cyclization and polymerization catalysts for polyisocyanates are suitable for preparing isocyanurate group containing foams. Individual examples are: strong bases such as quaternary ammonium hydroxides, e.g. benzyltrimethylammonium hydroxides; alkali metal hydroxides, for example sodium or potassium hydroxides; alkali metal alkoxide, e.g. sodium methylate and potassium isopropylate; trialkylphosphines, e.g. triethylphosphine; alkylaminoalkylphenols, e.g. 2,4,6-tris-(dimethylaminomethyl)-phenol; 3- and/or 4-substituted pyridines, e.g. 3 or 4-methylpyridine; metal organic salts, e.g. tetrakis-(hydroxyethyl)-sodium borate; Friedel-Crafts-Catalysts for example aluminum chloride, iron (III)-chloride, boron fluoride and zinc chloride and alkali metal salts of weak organic acids and nitrophenolates for example potassium octoate, potassium 2-ethylhexoate, potassium benzoate, sodium picrate and potassium phthalimide. Preferably used are the strongly basic N,N',N''-tris-(dialkylaminoalkyl)-s-hexahydrotriazines, for example N,N',N''-tris-(dimethylaminopropyl)-s-hexahydrotriazine, optionally combined with aliphatic lower molecular weight mono- and/or dicarboxylic acids for example acetic acid and/or adipic acid or aromatic carboxylic acids such as benzoic acid.

The required amount of isocyanurate group forming catalysts depends on the effectiveness of the individual catalysts. Generally, it has shown to be effective to use from 1 to 15 parts by weight, more preferably from 3.5 to 10 parts by weight of catalysts for each 100 parts by weight of organic polyisocyanate.

In addition urethane and isocyanurate group promoting catalysts also may be mixed in when preparing urethane and isocyanurate group containing foams.

According to the process of invention, rigid foams are preferably prepared without the additional use of ordinary chain extending agents or cross-linking agents. Yet, in many instances because of technological processing reasons it has proven to be practical to employ either change extending and/or cross-linking agents. Typical chain extenders or cross-linkers have molecular weights from 30 to 600, more preferably 60 to 300 and possess preferably 2 active hydrogen atoms. Typical examples are aliphatic and/or aromatic diols having from 2 to 14, more preferably 2 to 6 carbon atoms such propanediol, pentanediol, 1,6-hexanediol and more preferably ethanediol, 1,4-butanediol and bis-(2-hydroxyethyl)-hydroquinone, diamines, such as ethylenediamines and optionally 3,3'- and/or 3,3 ', 5,5'-di and/or tetra substituted 4,4'-diaminodiphenylmethanes, ethanolamines, such as triethanolamine and polyhydroxyl compounds such as glycerine, trimethylolpropane and lower molecular weight hydroxyl group containing polyalkylene oxides from the previously stated starting materials.

Auxillaries and additives may also be incorporated into the reaction mixture. Typical examples are stabilizers, agents to protect against hydrolysis, cell-regulators, both fungistatic and bacteriostatic agents, colorants pigments fillers, surfactants and plasticizers.

Typical organic filers are: polyesters having melting points below 190° C., more preferably cross-linked polyesters based on di- or higher functional carboxylic acids with di- or monomers such as methacrylic acid derivatives, homopolymers and copolymers of cyclopentadiene, ketone resins for example those based on cyclohexanone and brittle polyurethane materials, having melting points over 190° C., for example cross-linked polyurethanes and isocyanurate group containing polyurethanes, polyvinyl chloride, polyamide-6 and polyamide-6,6, acrylate graft rubbers, butadiene graft rubbers and polyvinyl acetate.

However, most preferred are inorganic fillers, such as the essentially known conventional fillers, reinforcing agents, weight increasing agents, agents for improving the wear in paints, coatings, etc., and in addition inorganic pigments may also be employed. Individual examples are: silicate minerals, for example fibrous silicates such as antigorite, serpentine, hornblends, amphiboles, crystallite, talcum, metal oxide such as kaolin, aluminum hydroxides, titanium dioxide, iron oxides, metal salts such as chalk, heavy spar, barium sulfate, inorganic pigments such as cadmium sulfide, zinc sulfide as well as glass.

Surfactants are also examples of auxiliaries which serve to support the homogeneization of the starting components and which are also optionally suited for regulating the cell structure of the foam. Typical examples are: siloxane oxyalkylene mixed polymers, and other organopolysiloxanes, oxyethylated alkylphenols, oxyethylated fatty alcohols, paraffin oils, caster oil and/or caster oil esters and Turkey red oil, all of which are employed in quantities from 0.1 to 5 weight percent per 100 parts by weight of the mixture comprising polyisocyanate and polyols.

Further information regarding other conventional additives is found in the technical lecture, for example in the monograph of J. H. Saunders and K. C. Frisch, entitled *High Polymers*, Volume XIV, Polyurethanes, Parts 1 and 2, Interscience Publishers 1962 and/or 1964.

When preparing the urethane group containing foams, the organic polyisocyanates are reacted with the polyols, preferably the polyester polyols and/or polyether polyols, in such quantities so that the ratio of reactive hydrogen atoms to NCO groups is from 1:08 to 2.5, more preferably 1:09 to 1.2 and most preferably about 1:1.

When preparing urethane group and isocyanurate. group containing foams, typical quantity ratios of NCO groups from the polyisocyanates to the reactive hydrogen atoms in the polyols are from 6:1 to 60:1 and more preferably from 2:1 to 10:1.

The urethane and/or isocyanurate group containing foams are preferably prepared using the one shot process. In so doing, one mixes the polyisocyanates with the polyols, catalysts, blowing agents and optionally auxiliaries and additives together in the previously stated quantity ratios at temperatures from 0° to 50° C., more preferably from 15 to 40° C., and then they are foamed in either open or closed molds. The flame retardant used according to the process of invention is most preferably suited for foams exhibiting generally unit densities below 200 kg/m$^3$, most preferably 100 kg/m$^3$.

The following details can be noted with respect to said flame retardant.

Preferably, said flame retardant comprises, e.g. in a solid mixture, from 10 to 50 weight percent of a phenol and/or a melamine formaldehyde condensate, from 5 to 50 weight percent of pentaerythritol, from 10 to 50 weight percent of ammonium phosphate as well as from 5 to 50 weight percent of dicyandiamide, whereby the total of 100 weight percent is based on the flame retardant i.e. the mixture and/or the total of the components.

The components, pentaerythritol and/or dicyandiamide are thought of in terms of "A heat reducing organic nitrogen compound and/or a carbohydrate or a multivalent alcohol".

The flame retardant is preferably added to polyurethane foams, generally in amounts up to 80 weight percent, based on the total weight of reaction mixture present before foaming. Preferably the flame retardant and/or its components are added to the polyol components of the polyurethane raw materials. The flame retardant is ordinarly added in a water free form, i.e. when using resins (formaldehyde condensates) it is then in the form of a suitable powder.

Typical melamine formaldehyde condensates are conventional resins obtained by the further condensation of methylol melamines, which generally are heat curable and which are used as coating raw materials, adhesives for wood, etc., plastic resin bound coatings (the so called impregnating resins) or they are found in paper and in textile auxiliaries. Typical suitable resins and their preparation are described in the corresponding handbooks for example in The Plastics Handbook, Volume 10, Hanser Publishers, Munich 1968 or described by Blais, Amino Resins, New York, 1959, Reinhold Publisher Corporation.

The most preferred melamine resins have a mole ratio of formaldehyde to melamine of 1.5 to 2.5; they may be modified by co-employing other condensable raw materials such as urea, thiourea, phenols, as well as in place of and/or in addition to formaldehyde also acetaldehyde, isobutyraldehyde, etc.

Preferred phenol resins are those which cure independently, namely resole condensates having a content of more than one mole of formaldehyde per mole of phenol, whereby the phenol can also be for example cresol, xylenol or naphthol. Such resins for a mulitude of applications are described in the appropriate handbooks, particularly in the previously stated plastics handbook.

Selecting a suitable resin is not difficult nor critical for the intended purpose of making polyurethane foams flame resistant.

The same holds true for the generic term ammonium phosphate: here for the purpose of this invention one should understand salts of monomeric or polymeric phosphoric acids, which are commerically available for many applications. Typical are e.g. ammonium dihydrogenphosphate, ammonium orthophosphate, and ammonium polyphosphate.

Finally it should be pointed out that in place of pentaerythritol, its dimers and dipentaerythritol can be used.

Examples

General production procedure for a polyurethane foam made flame resistant according to the process of the invention.

A-Component: A mixture of polyol, said flame retardant, trichlorofluoromethane, a foam stabilizer and catalysts.

B-Component: A mixture of diphenylmethane-diisocyanates and polyphenyl-polymethylene-polyisocyanates.

In preparing foam molded articles for both experimental and demonstration purposes, the A and B components were intensively mixed together at 23° C. and poured into a box (it size was 22×22×20 cm) where the components were allowed to foam.

The type and quantity of starting components used as well as the unit densities and fire behavior of the foams obtained are complied in the following tables.

The abbreviations used for the starting materials in the tables are as follows:

Polymeric MDI

A mixture comprising diphenylmethane-diisocyanates and polyphenyl-polymethylene-polyisocyanates. The NCO content equals 31 percent.

Crystalline Suspension

A crystalline suspension having an OH number of 265, comprising 48 parts of a sucrose polyol, 28 parts of a diethylene glycol adipate and 24 parts of neopentyl glycolisophthalate.

Thermolin ® RF 230

A halogen containing flame retardant based on trichlorobutyleneoxide polymers. A commercial product from the Olin Company, for comparison purposes.

G 70-600

A polyol which is a commercial product from the Olin Company.

Bromkal ® 70

A mixture of brominated diphenylether, a commercial product from the Fabrik Kalk Chemical Company, for comparison experiments.

DC 193

A foam stablizer based on silicone, a commercial product from the Dow Corning Company

TEA

Triethylamine

KAT:

Potassium formate; a 35 percent solution in ethylene glycol

R 11

Trichlorofluoromethane

Dabco ® TMR 2

A catalyst based on trimethyl-2-hydroxypropylammonium formate a commercial product from the Air Products Company Polyol A Based on sucrose/propyleneoxide OH-number equals 400

Polyol B

Propylene glycol having an OH number of 250

EXAMPLES 1-8

Composition of the polyurethane foam:
⅓ polyol (Elastogran H 135/3)
⅓ MDI (diphenylmethane diisocyanate) B 228 - Elastogran
⅓ basic flame retardant mixture The respective amount of basic flame retardant mixture is cited in the individual examples.

EXAMPLE 1

Basic flame retardant mixture:
40 percent ammonium phosphate
10 percent dicyandiamide
25 percent pentaerythritol
25 percent melamine resin Fire Behavior: good, uniform foaming, good mold stability, no smoldering after burning has ended.

EXAMPLE 2

Basic flame retardant mixture:
44 percent ammonium phosphate
24 percent pentaerythritol
32 percent melamine resin Fire behavior: Good foaming behavior, good mold stability, foam structure not as uniform as in example 1, hardly any smoldering after burning has ended.

EXAMPLE 3

Basic flame retardant mixture:
42 percent ammonium phosphate
27 percent dicyandiamide
31 percent melamine resin Fire behavior: little foaming, molded article shrank when ignited, some smoldering after burning has ended.

EXAMPLE 4

Basic flame retardant mixture:
45 percent ammonium phosphate
30 percent dicyandiamide
25 percent pentaerythritol Fire behavior: comparable with Example 3

EXAMPLE 5

Basic flame retardant mixture:
34 percent dicyandiamide
29 percent pentaerythritol
37 percent melamine resin Fire behavior: no foaming, molded article shrank when ignited, smoldered a lot after the burning had ended.

EXAMPLE 6

Basic flame retardant mixture:
100 percent ammonium phosphate

Fire Behavior: minimal foam formation, the foam shrank when ignited, smoldering after burning completed.

EXAMPLE 7

Basic flame retardant mixture:
40 percent ammonium phosphate
10 percent dicyandiamide
25 percent pentaerythritol
25 percent phenol resin Fire behavior: comparable with Example 1

EXAMPLE 8

Basic flame retardant mixture:
35 percent ammonium phosphate
20 percent hexamethylenetetramine
20 percent sodium gluconate
25 percent melamine resin Fire behavior: little yet uniform foaming, good mold stablity and hardly any smoldering after the burning had ended.

Comparative Experiments

COMPARISON A

An unprotected polyurethane comprising 50 percent polyol and 50 percent MDI

Fire behavior: no foaming, the molded article immediately burned when ignited, it shrank with a lot of intense burning, and there was intense smoldering after burning had ended.

COMPARISON B

An unprotected polyurethane of
200 parts MDI (4,4'-diphenylmethane diisocyanate)
100 parts polyester polyol OH-number equals 300
30 parts of Freon R11
4 parts of catalysts for polyisocyanurate formation
4 parts of an amine containing polyurethane-catalyst and
0.4 parts of dimethylcyclohexylamine Fire behavior: no foam formation, the molded article shrank a lot and vigorously burned following ignition and there was smoldering after burning had ended.

COMPARISON C

A polyurethane-foam described under B containing in addition 10 parts of Fyrol 6 (a reactive flame retardant from Kalichemie)

Fire behavior: no foaming, the molded article shrank and burned when ignited and there was little smoldering after completion of the burning.

EXAMPLE 9

A polyurethane-foam as described in comparison example B containing in addition 200 parts of basic flame retardant mixture according to Example 1.

Fire behavior: good foaming behavior, no shrinking when ignited and hardly any smoldering after burning had ended.

Using a gas jet, burn through times were reported on molded articles having dimensions 25×18×2.6 cm. The molded articles were made from two 3 mm rigid fiber plaques, which were cemented to a frame made from 20×20 mm rigid bars. The hollow space was filled with a polyurethane-foam which was prepared according to the process of the invention of compositions as found in the comparison experiments, with conventional equipment.

A Comparative Experiment

A molded article having the above described composition with a polyurethane-foam filling whose composition was according to comparison Example A was subjected to gas jet ignition. After 3 minutes, the polyurethane-foam in the area of burning had completely sintered away. The burn through occurred after 7 minutes of test time.

A Comparative Experiment

A molded article having a polyurethane-foam filling as described in comparison Example C was also subjected to gas jet ignition. After 7 minutes the polyurethane-foam in the burning area was completely destroyed. The burn through occurred after 10 minutes.

EXAMPLE 10

A molded article having a polyurethane-foam filling according to Example 2 was subjected to the gas jet inigition. After 20 minutes of testing time burn through occurred. The foam structure in the burning center was still partially intact.

EXAMPLE 11

A molded article having a polyurethane-filling according to example 1 was subject to gas jet ignition. After 20 minutes of testing time the burn through occurred. The foam structure in the burning center was still partially intact.

EXAMPLE 12

A molded article having a polyurethane-filling with the following composition was also subjected to gas jet ignition.

Polyurethane Foam Composition:

25 percent polyol (Elastogran H 135/3)

25 percent of MDI (diphenylmethane diisocyanate) (B 228-Elastogran)

50 percent of basic flame retardant mixture according to Example 1.

After 37 minutes of testing time burn through occurred. The foam structure in the burning center was for the most part still intact.

The embodiments of the invention in which an exclusive privilege or property is claimed are defined as follows:

1. A flame-resistant composition containing polyurethane and/or polyisocyanurate groups, comprising reacting an organic polyisocyanate with a polyol in the presence of flame retardants, catalysts, blowing agents, chain extending agents, crosslinking agents, auxiliary agents and additives, wherein the flame retardant comprises:
    (a) a phenol- or melamine formaldehyde condensate,
    (b) a carbohydrate or multivalent alcohol,
    (c) ammonium phosphate, and
    (d) a heat reducing organic nitrogen compound.

2. The composition of claim 1 wherein the flame retardant comprises from
    (a) 10 to 50 weight percent of a phenol - and/or melamine-formaldehyde condensate,
    (b) 5 to 40 weight percent of pentaerythritol, and
    (c) 10 to 60 weight percent of ammonium phosphate, of the total of 100 weight percent of the flame retardant.

3. A process for the preparation of the composition of claim 1 wherein the flame retardant is added to the polyol before mixing the reactants together.

4. A process for the preparation of the composition of claim 2 wherein the flame retardant is added to the polyol before mixing the reactants together.

* * * * *